United States Patent
Subramanyam et al.

(10) Patent No.: US 12,155,583 B1
(45) Date of Patent: Nov. 26, 2024

(54) MULTI-TENANT CLOUD MIGRATION ORCHESTRATION

(71) Applicant: MOTOROLA SOLUTIONS, INC., Chicago, IL (US)

(72) Inventors: Srividya G. Subramanyam, South Barrington, IL (US); Marcin Kalinowski, Cracow (PL); Marcin Michalak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/490,950

(22) Filed: Oct. 20, 2023

(51) Int. Cl.
*H04L 47/83* (2022.01)
*H04L 47/74* (2022.01)

(52) U.S. Cl.
CPC ............ *H04L 47/83* (2022.05); *H04L 47/745* (2013.01)

(58) Field of Classification Search
None
See application file for complete search history.

(56) References Cited

U.S. PATENT DOCUMENTS

| | | | |
|---|---|---|---|
| 9,069,599 | B2 | 6/2015 | Martinez et al. |
| 9,563,479 | B2 | 2/2017 | Ferris et al. |
| 10,721,137 | B2 | 7/2020 | Ganguli et al. |
| 11,140,553 | B1 | 10/2021 | Taylor et al. |
| 11,824,794 | B1 * | 11/2023 | Childress ............ H04L 47/822 |
| 12,067,417 | B2 * | 8/2024 | Chen ..................... G06F 9/4856 |
| 2013/0198564 | A1 * | 8/2013 | Hasit ................. G06F 17/30079 709/219 |
| 2020/0389411 | A1 | 12/2020 | Yang et al. |
| 2021/0136233 | A1 | 5/2021 | McDonald et al. |
| 2022/0206844 | A1 | 6/2022 | Subramanyam et al. |
| 2023/0092091 | A1 | 3/2023 | Gustof et al. |
| 2023/0401087 | A1 * | 12/2023 | Kulkarni ............... G06F 9/5077 |

FOREIGN PATENT DOCUMENTS

| | | | | |
|---|---|---|---|---|
| CN | 112395046 | A * | 2/2021 | ............ G06F 30/20 |
| CN | 116489158 | A * | 7/2023 | |
| KR | 2023069488 | A * | 5/2023 | ......... G06F 9/45558 |
| WO | WO-2019132299 | A1 * | 7/2019 | ............... G06F 9/50 |

* cited by examiner

*Primary Examiner* — Jeffrey R Swearingen
(74) *Attorney, Agent, or Firm* — Michael Best & Friedrich LLP

(57) ABSTRACT

Examples provide a cloud server management controller configured to determine a network resource threshold and a cloud resource availability for a cloud server. The first resource availability is an amount of cloud network resources available in the cloud server within the network resource threshold. For each respective system of a plurality of local network systems, the controller determines a local resource usage and predicts a cloud resource requirement. The cloud resource requirement is an amount of cloud network resources required to provide a cloud-based equivalent of the respective system. The controller builds a model based on the cloud resource requirement for each respective system and the network resource threshold. The model defines a cloud migration priority for each of the plurality of local network systems. Based on the model, the controller generates a cloud migration timeline for sequentially migrating each respective system to the cloud server.

20 Claims, 10 Drawing Sheets

MULTI-TENANT CLOUD MIGRATION ORCHESTRATION

BACKGROUND

Public safety and other organizations use wireless networks and portable electronic devices to facilitate communication among their members. For example, members may use portable two-way radios, smart telephones, and converged devices, which are configured to operate over multiple networks, for example land mobile radio (LMR) networks and long-term evolution (LTE) networks. Some wireless networks provide multiple modes of communication among groups of hundreds or even thousands of devices. Such networks utilize computer-based controllers to provision access, organize talk groups, set up and maintain calls, transmit data streams, and track performance of the networks. To provide redundancy and other benefits, some networks utilize multi-tenant cloud computing environments and other shared computing environments to house network control functions remotely.

Figure 1:
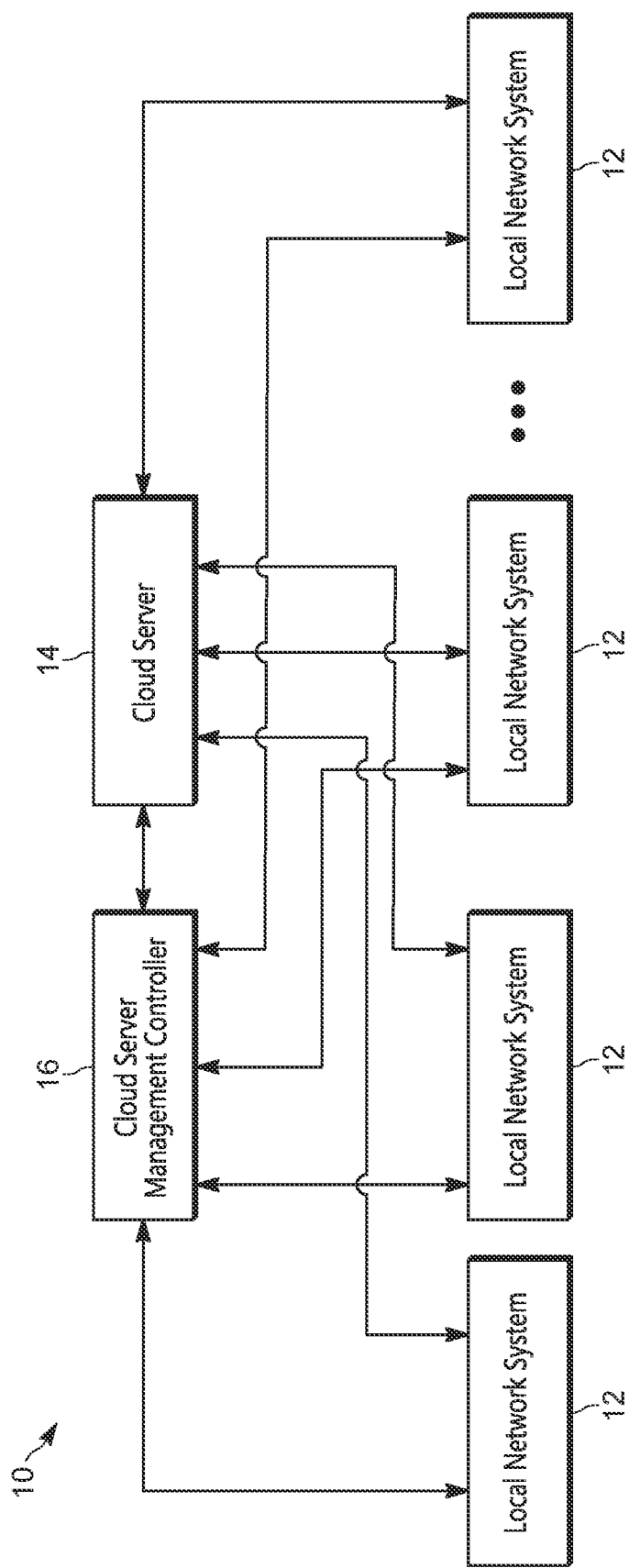
FIG. 1 illustrates a network system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments, examples, aspects, and features.

The apparatus and method components have been represented where appropriate by conventional symbols in the drawings, showing only those specific details that are pertinent to understanding the embodiments, examples, aspects, and features described and illustrated so as not to obscure the disclosure with details that will be readily apparent to those of ordinary skill in the art having the benefit of the description herein.

DETAILED DESCRIPTION

For each on-premise, local network system that is transitioned to a multi-tenant cloud computing environment, there is an increase in the amount of cloud resources required to manage each on-premise tenant. Different systems use may use different features and functions, which require differing amounts of resources in the cloud-environment. For example, some systems may include trunking radiofrequency ("RF") sites, while others include traditional LMR sites. Systems may use a variety of features such as voice, data, and/or the like. Additionally, systems may use various redundancy options, such as geographic redundancy and/or high availability. Transitioning multiple systems to cloud-facing services requires efficiently managing cloud resources, for example, to reduce costs associated with performing the transition of on-premise systems while reducing an amount of time required to perform the transitions. For example, the planned or ongoing migration of a system may be impacted by incidents including, for example, network faults, weather impacts (e.g., storms, floods, natural disasters, etc.), in-building incidents at sites (e.g., fires, power outages, etc.), or an influx of calls to system call centers.

Thus, there is a need for an efficient and dynamic management of workload transitions to the cloud. One example provides a cloud server management system including an electronic processor configured to determine a first network resource threshold for a cloud server, and determine a first cloud resource availability. The first resource availability is an amount of cloud network resources available in the cloud server within the first network resource threshold. For each respective system of a plurality of local network systems, the electronic processor is configured to determine a local resource usage, and predict a cloud resource requirement. The local resource usage is an amount of local network resources used by the respective system. The cloud resource requirement is an amount of cloud network resources required to provide a cloud-based equivalent of the respective system in the cloud server. The electronic processor is also configured to build a model based on the cloud resource requirement for each respective system and the first network resource threshold, based on the model, generate a cloud migration timeline for sequentially migrating each respective system to the cloud server; and initiate migration of the plurality of local network systems to the cloud server according to the cloud migration timeline. The model defines a cloud migration priority for each of the plurality of local network systems.

In some aspects, the first network resource threshold includes at least one selected from the group consisting of a maximum number of users, a maximum storage capacity, a maximum event throughput, and a maximum number of microservice instances.

In some aspects, the electronic processor is configured to generate the cloud migration timeline by selecting a first system included in the plurality of local network systems for which the cloud resource requirement of the first system is less than or equal to the first cloud resource availability, and schedule migration of the first system at a time in the cloud migration timeline before a scheduled migration of a respective system for which the cloud resource requirement of the respective system is greater than the first cloud resource availability.

In some aspects, the electronic processor is further configured to determine a second cloud resource availability, wherein the second cloud resource availability is an amount of cloud network resources available in the cloud server after migration of the first system and within the first network resource threshold, determine a second network resource threshold for the cloud server that is greater than the first network resource threshold, determine a third cloud resource availability, wherein the second cloud resource availability is an amount of cloud network resources available in the cloud server after migration of the first system and within the second network resource threshold, select a second system included in the plurality of local network systems for which the cloud resource requirement of the second system is greater than the second cloud resource availability but less than or equal to the third cloud resource availability, and schedule migration of the second system at a time in the cloud migration timeline after a scheduled migration of the first system but before a scheduled migration of a respective system for which the cloud resource requirement is greater than the third cloud resource availability.

In some aspects, the first system is included in a first set of systems, the first set of systems include a maximum number of systems for which a total of the cloud resource requirement of each system included in the first set of systems is less than or equal to the first cloud resource availability, and the electronic processor is further configured to schedule an upgrade of the model at a time in the cloud migration timeline that is after a scheduled migration of each system included in the first set of systems but before a scheduled migration of a different system not included in the first set of systems, wherein the upgrade is associated with a second network resource threshold for the cloud server that is larger than the first network resource threshold.

In some aspects, the electronic processor is configured to select the maximum number of systems included in the first set of systems by predicting a future local network resource usage of each of the plurality of local network systems, and a total future network local resource usage of the first set of systems is less than or equal to the first cloud resource availability.

In some aspects, the electronic processor is further configured to apply a data reduction strategy to the scheduled migration of the first system, and the cloud resource requirement of the first system is determined according to the data reduction strategy.

In some aspects, the electronic processor is further configured to monitor for incidents that may interfere with a scheduled migration of a respective system in the cloud migration timeline, and, in response to identifying an incident that may interfere with the scheduled migration of a respective system, modify the cloud migration timeline by pausing or postponing the scheduled migration of the respective system.

In some aspects, the incident includes at least one selected from the group consisting of a weather event near a site included in the respective system, a network fault in the respective system, increased call volume to a call center included in the respective system, and a building incident at a site included in the respective system.

In some aspects, the incident is a predicted incident.

In some aspects, modifying the cloud migration timeline includes selecting a subsequently scheduled migration in the cloud migration timeline, and initiating migration of the subsequently scheduled migration while the respective migration is paused or postponed.

In some aspects, each respective system is associated with a number of sites, a number of users, and a network storage usage.

In some aspects, the cloud resource requirement of the respective system in the cloud server includes an amount of cloud network resources required to perform the migration and an amount of cloud network resources required to maintain the cloud-based equivalent.

In some aspects, each respective system is associated with a migration history of migrated workloads included in the respective system, and the electronic processor is further configured to modify the cloud migration timeline in response to predicting, based on the migration history of the respective system, at least one selected from the group consisting of an amount of time required to migrate other workloads of the respective system and an amount of cloud network resources required to migrate other workloads of the respective system.

Another example provides a method for orchestrating multi-tenant cloud migration. The method includes determining a first network resource threshold for a cloud server; determining a first cloud resource availability, wherein the first resource availability is an amount of cloud network resources available in the cloud server within the first network resource threshold; for each respective system of a plurality of local network systems, determining a local resource usage, wherein the local resource usage is an amount of local network resources used by the respective system, and predicting a cloud resource requirement, wherein the cloud resource requirement is an amount of cloud network resources required to provide a cloud-based equivalent of the respective system in the cloud server; building a model based on the cloud resource requirement for each respective system and the first network resource threshold, the model defining a cloud migration priority for each of the plurality of local network systems; based on the model, generating a cloud migration timeline for sequentially migrating each respective system to the cloud server; and initiating migration of the plurality of local network systems to the cloud server according to the cloud migration timeline.

In some aspects, the first network resource threshold includes at least one selected from the group consisting of a maximum number of users, a maximum storage capacity, a maximum event throughput, and a maximum number of microservice instances.

In some aspects, generating the cloud migration timeline includes selecting a first system included in the plurality of local network systems for which the cloud resource requirement of the first system is less than or equal to the first cloud resource availability, and scheduling migration of the first system at a time in the cloud migration timeline before a scheduled migration of a respective system for which the cloud resource requirement of the respective system is greater than the first cloud resource availability.

In some aspects, the method further includes determining a second cloud resource availability, wherein the second cloud resource availability is an amount of cloud network resources available in the cloud server after migration of the first system and within the first network resource threshold; determining a second network resource threshold for the cloud server that is greater than the first network resource threshold; determining a third cloud resource availability, wherein the third cloud resource availability is an amount of cloud network resources available in the cloud server after migration of the first system and within the second network resource threshold; selecting a second system included in the plurality of local network systems for which the cloud resource requirement of the second system is greater than the second cloud resource availability but less than or equal to the third cloud resource availability; and scheduling migration of the second system at a time in the cloud migration timeline after a scheduled migration of the first system but before a scheduled migration of a respective system for which the cloud resource requirement is greater than the third cloud resource availability.

In some aspects, the first system is included in a first set of systems, the first set of systems include a maximum number of systems for which a total of the cloud resource requirement of each system included in the first set of systems is less than or equal to the first cloud resource availability, and the method further comprises scheduling an upgrade of the model at a time in the cloud migration timeline that is after a scheduled migration of each system included in the first set of systems but before a scheduled migration of a different system not included in the first set of systems, wherein the upgrade is associated with a second network resource threshold for the cloud server that is larger than the first network resource threshold.

In some aspects, selecting the maximum number of systems included in the first set of systems includes predicting a future local network resource usage of each of the plurality of local network systems, and a total future network local resource usage of the first set of systems is less than or equal to the first cloud resource availability.

FIG. 1 illustrates a network system 10 including a plurality of on-premise, locally-hosted network systems 12, which are sometimes referred to herein as local networks 12 or local network systems 12. Each local network system 12 is a private communication system, associated with, for example, a school district, a public safety organization, a utility company, a private company, or the like. Each local network system 12 may be associated with a respective network infrastructure and a respective plurality of user devices. However, in some instances, one or more of the local network systems 12 use shared resources, such as, for example, a shared data center.

The network system 10 also includes a cloud server 14 and a cloud management controller 16, each communicatively connected with the plurality of local network system 12. The cloud server 14 and the cloud management controller 16 are described in greater detail below with respect to FIGS. 3 and 4.

Figure 2:
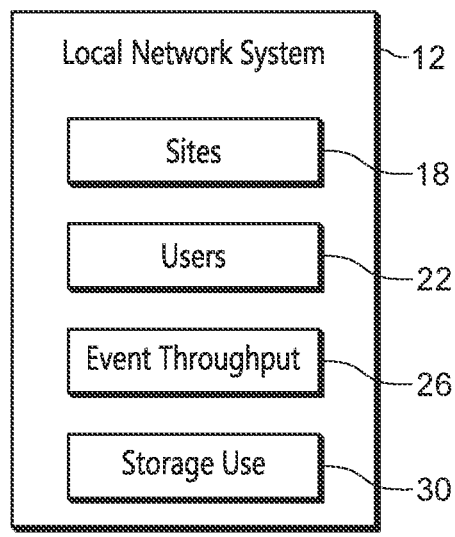
FIG. 2 illustrates a local network system, according to some examples.

FIG. 2 illustrates an example local network system 12, according to some aspects. Some or all applications and workloads of the respective local network system 12 are locally-hosted. Each respective local network system 12 may be associated with a plurality of sites or domains 18 associated with physical network components, a plurality of registered users 22 serviced by the respective local network system 12, an event throughput 26 (defined by, for example, a number of calls made within the local network system 12 per month or other network events), and a network storage usage 30.

Figure 3:
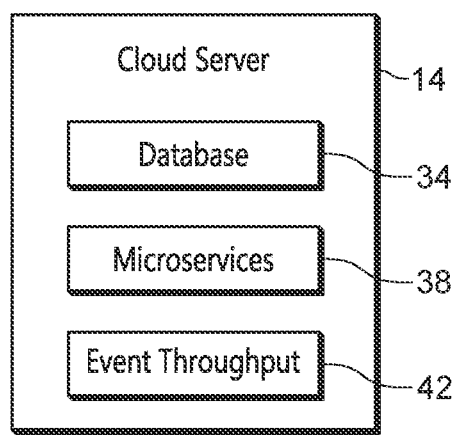
FIG. 3 illustrates a cloud server, according to some examples.

FIG. 3 illustrates the cloud server 14, according to some examples. As described above, workloads of each of the local network systems 12 may be locally-hosted. As cloud-computing technology expands, many organizations, such as public safety organizations, school districts, and the like, may seek to transition, or migrate, workloads of their respective local network system 12 to cloud-facing services hosted by, for example, the cloud server 14. The cloud server 14 is a cloud computing environment configured to provide applications and other computing services for migrated ones of the plurality of local networks 12. In order to host the plurality of local network systems 12, the cloud server 14 may provide, among other things, a database 34 (e.g., a customer records database 34), a plurality of microservices 38, and an event throughput 42.

The cloud server 14 may be associated with a particular usage tier or model. For example, a first tier of the cloud server 14 may define a first maximum database size, a first maximum number of microservices instances, and a first maximum event throughput. The first tier may also be associated with a cost (e.g., a yearly cost, a quarterly cost, a monthly cost, an hourly cost, and/or the like) for providing network services for migrated ones of the local network systems 12. A second, upgraded tier of the cloud server 12 may define a second maximum database size that is larger than the first database size, a second maximum number of microservice instances that is greater than the first number of microservice instances, and/or a second maximum event throughput that is greater than the first maximum event throughput. The second tier may also be associated with a cost (e.g., a yearly cost, a quarterly cost, a monthly cost, an hourly cost, and/or the like) for providing network services for migrated ones of the local network systems 12.

Figure 4:
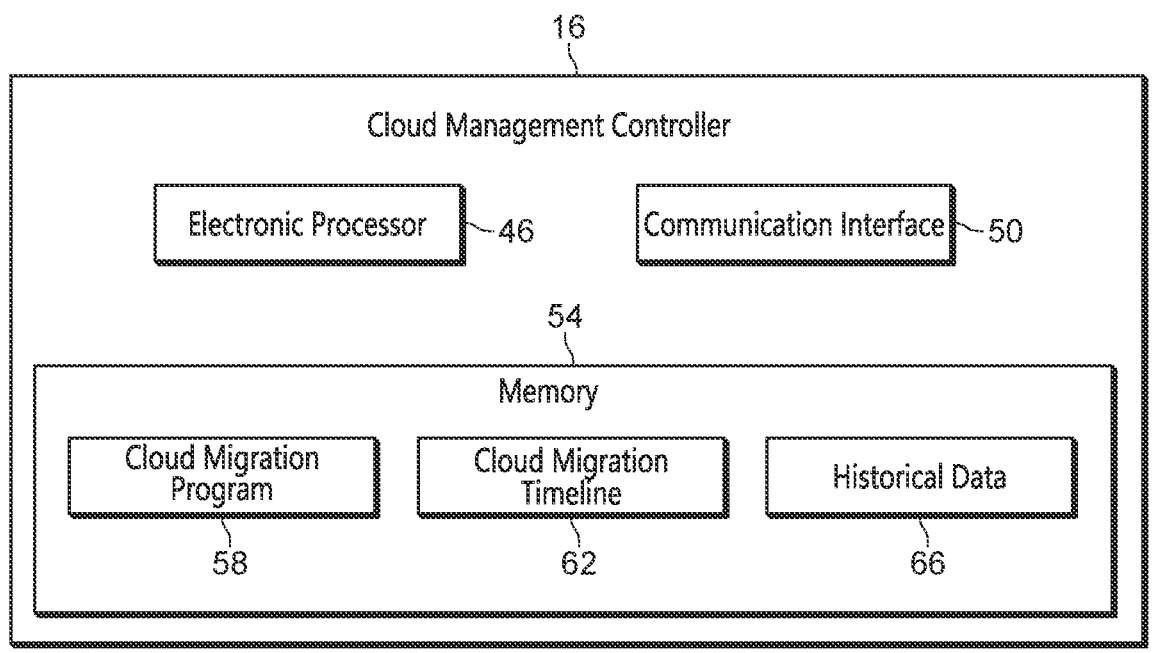
FIG. 4 illustrates a cloud management controller, according to some examples.

Referring now to FIG. 4, an example of the cloud management controller 16 is illustrated. As described above, different local network systems 12 may require different amounts of cloud resources within the cloud server 14 during and after migration to the cloud server 14. The cloud management controller 16 is configured to manage transitions of local network systems 12 to the cloud server 14 in order to reduce costs, maintain efficient use of cloud resources, reduce time required to perform migrations, and mitigate risks (e.g., network fault risks, data loss risks, etc.) associated with performing cloud migrations of respective ones of the plurality of local networks 12.

In certain examples, the cloud management controller 16 therefore includes, among other things, an electronic processor 46 and a communication interface 50 for enabling communication between the electronic processor 46, each of the plurality of local network systems 12, and the cloud server 14. The cloud management controller 16 also includes a memory 54 storing, for example, a dynamic cloud migration program 58 for planning and facilitating migration of the plurality of local network systems 12 to the cloud server 14, a cloud migration timeline 62, and historical data 66 associated with previous resource usages and previous migrations of workloads in the plurality of local network systems 12. For case of explanation, the cloud management controller 16 is described and illustrated herein as a single controller separate from the cloud server 14. However, the cloud management controller 16 may be implemented as multiple cloud management controllers 16 each having any suitable number of electronic processors 46, communication interfaces 50, and memories 54. The cloud management controller 16 may reside locally, within the cloud, or be implemented in a distributed manner both locally and in the cloud.

Figure 5:
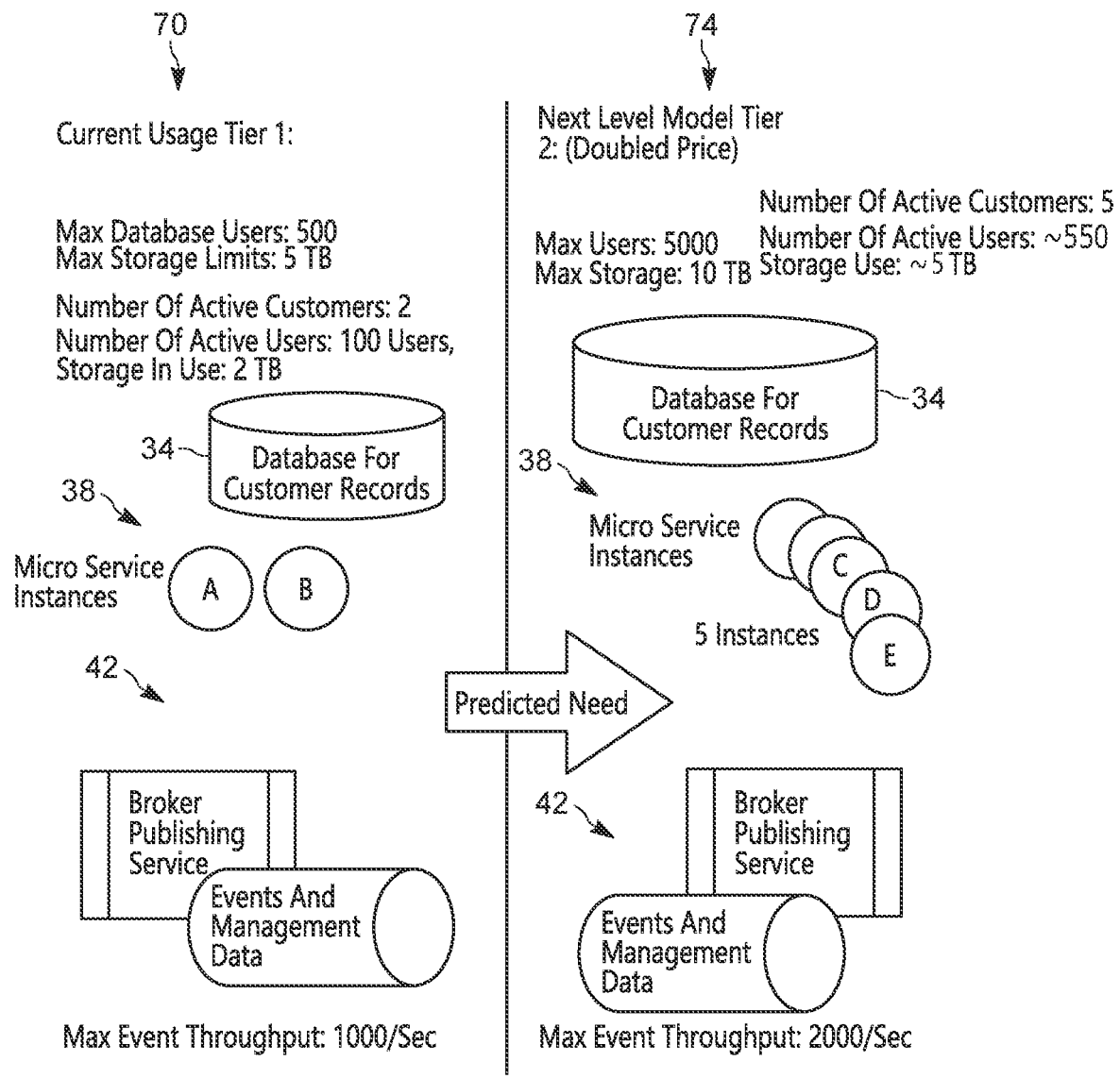
FIG. 5 illustrates a comparison of current and predicted cloud server usages, according to some examples.

As described above, the cloud server 14 may be associated with a particular usage tier. The cloud management controller 16, using, for example, the electronic processor 46, is configured to determine a current resource usage of the cloud server 14 and predict a future usage of the cloud server 14 based on one or more planned migrations of the plurality of local network systems 12. FIG. 5 illustrates a comparison of an example current usage 70 and predicted usage 74 of the cloud server 14. In the example illustrated in FIG. 5, the current usage 70 of the cloud server 14 includes two active customers, 100 active users, and a current storage usage of 2 TB. As used herein, the term "customers" may refer to respective "tenants" or organizations associated with respective migrated ones of the plurality of local network systems 12. The example current usage 70 reflects a network system 10 wherein two local network systems 12 have been migrated from a locally-hosted network to at least a partially cloud-hosted network. The current usage 70 of the cloud server 14 is associated with, for example, a first usage tier having a maximum user threshold of 500 users, a maximum storage limit of 5 terabytes ("TB"), a maximum event throughput of 1,000 events per second, and two microservice instances. Of course, these are just some examples, which are provided to help understand the more general concept of usage tiers.

The example predicted usage 74 of the cloud server 14 includes five active customers, approximately 550 active users, and approximately 5 TB of storage use. The predicted usage 74 of the cloud server 14 is associated with, for example, a second usage tier having a maximum user threshold of 5000 users, a maximum storage limit of 10 TB, a maximum event throughput of 2,000 events per second, and five microservice instances.

Figure 6:
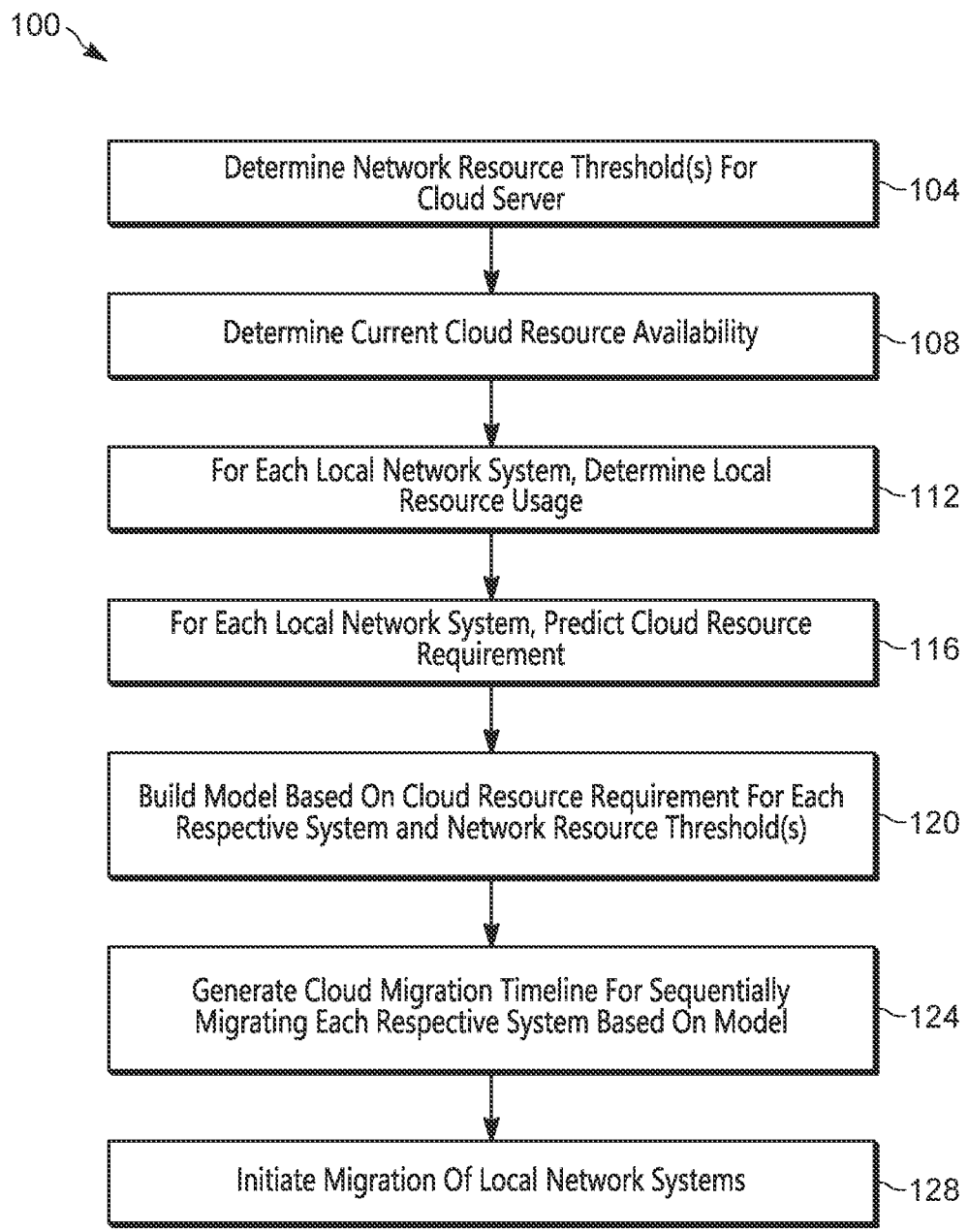
FIG. 6 illustrates a method for generating a cloud migration timeline, according to some examples.

The cloud management controller 16 is configured to determine when upgrades to the tiers of the cloud server 14 are necessary to perform and maintain scheduled migrations of local network system workloads. For example, the cloud management controller 16 predicts, based on planned migrations of the plurality of local network systems 12, when thresholds defined by a current model of the cloud server 14 will be reached, and schedules an upgrade of the model at a time before such thresholds are exceeded by subsequent migrations of local network systems 12. For example, FIG. 6 illustrates a method 100 performed by the cloud management controller 16 generating a cloud migration timeline for the plurality of local network systems 12.

The method 100 includes determining, with the cloud management controller 16, one or more cloud network resource thresholds for the cloud server 14 (at block 104). For example, the cloud management controller 16 may determine a first cloud network resource threshold defining a maximum number of network resources the network system 10 may use for a current usage tier of the cloud server 14. The cloud management controller 16 may also determine cloud network resource thresholds associated with subsequent upgraded tiers of the cloud server 14. Each cloud network resource threshold may include a maximum number of users (e.g., a maximum number of database users, a maximum number of teleservice users, and/or the like), a maximum storage capacity (e.g., a total maximum storage capacity and/or a maximum storage capacity per period of time, such as an hour, a month, a quarter, a year, or the like), a maximum event throughput, a maximum number of microservice instances, and/or the like.

The cloud management controller 16 also determines a current cloud resource availability within the current, or first, cloud network resource threshold (at block 108). The cloud management controller 16 may determine the current cloud resource availability based on a determined difference between the current resource threshold of the cloud server 14 and the current resource usage of the cloud server 14. Referring to the example of FIG. 5, the cloud management controller 16 may determine that a current resource availability of the cloud server 14, based on the example current usage 70, includes an availability for 400 new users and 3 more TB of storage.

For each respective local network system 12 (e.g., for each local network system 12 that has not yet been migrated), the cloud-management controller 16 determines a respective local resource usage (at block 112). The local resource usage is an amount of local network resources used by the respective system 12. For example, each respective local resource usage may include a current number of users, a current storage usage, and/or current event throughput defined by, for example, a number of calls or other network events.

For each respective local network system 12, the cloud management controller 16 also predicts a cloud resource requirement for the respective local network system 12 (at block 116). The cloud resource requirement is an amount of cloud network resources required of the cloud server 14 to provide a cloud-based equivalent of the respective system 12 in the cloud server 14. The amount of cloud network resources required to provide a cloud-based equivalent of the respective system 12 includes both the cloud network resources needed to perform the migration of the respective system 12 and to maintain the migration of the respective local network system 12 in the cloud server 14. For example, using the historical data 66, the cloud management controller 16 may track fluctuations in event throughput for each respective system over time, and determine the cloud resource requirement according to a maximum event throughput.

The cloud management controller 16 builds a model based on the cloud resource requirement for each respective local network system 12 and the current network resource threshold (at block 116). The model defines a cloud migration priority for each of the plurality of local network systems 12. For example, the cloud management controller 16 uses the model to determine a number of additional customers that can be migrated to the cloud server 14 within a current cloud network resource threshold. Based on the model, the cloud migration controller 16 generates a cloud migration timeline for sequentially migrating each respective local network system 12 to the cloud server 14 (at block 124), and initiates migration of the plurality of local network systems 12 to the cloud server 14 according to the cloud migration timeline (at block 128).

Figure 7A:
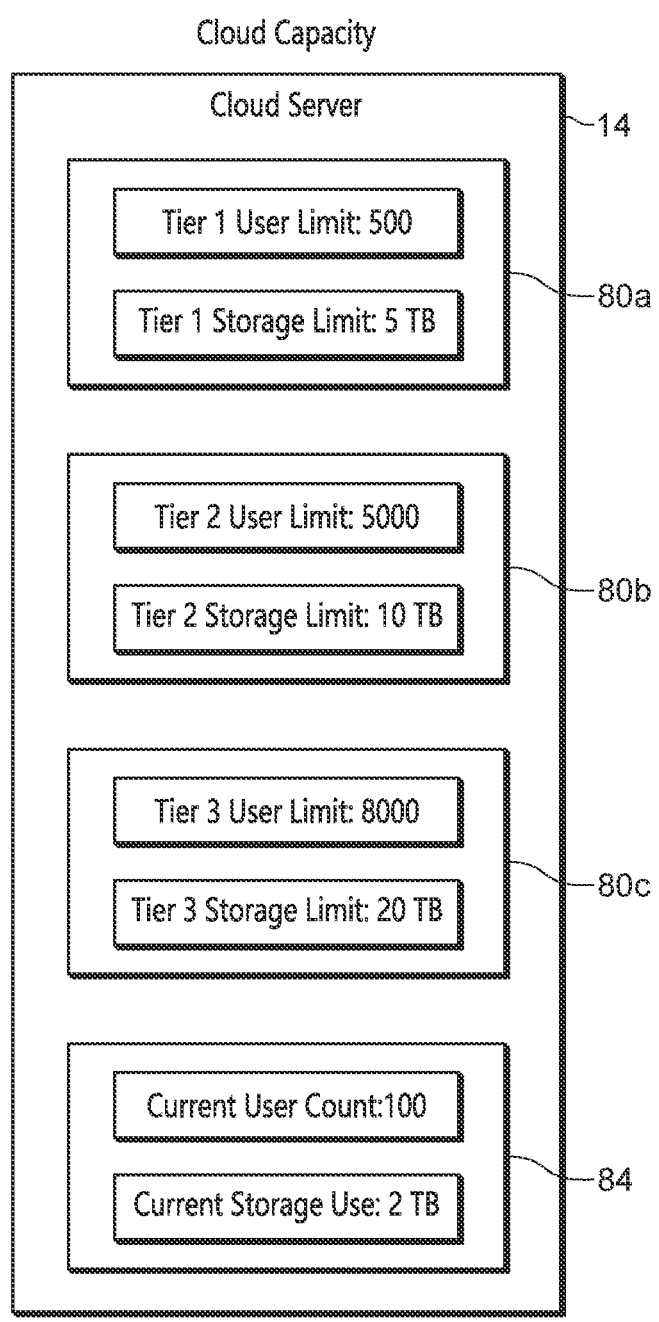
FIG. 7A illustrates an evaluated cloud server, according to some examples.
Figure 7B:
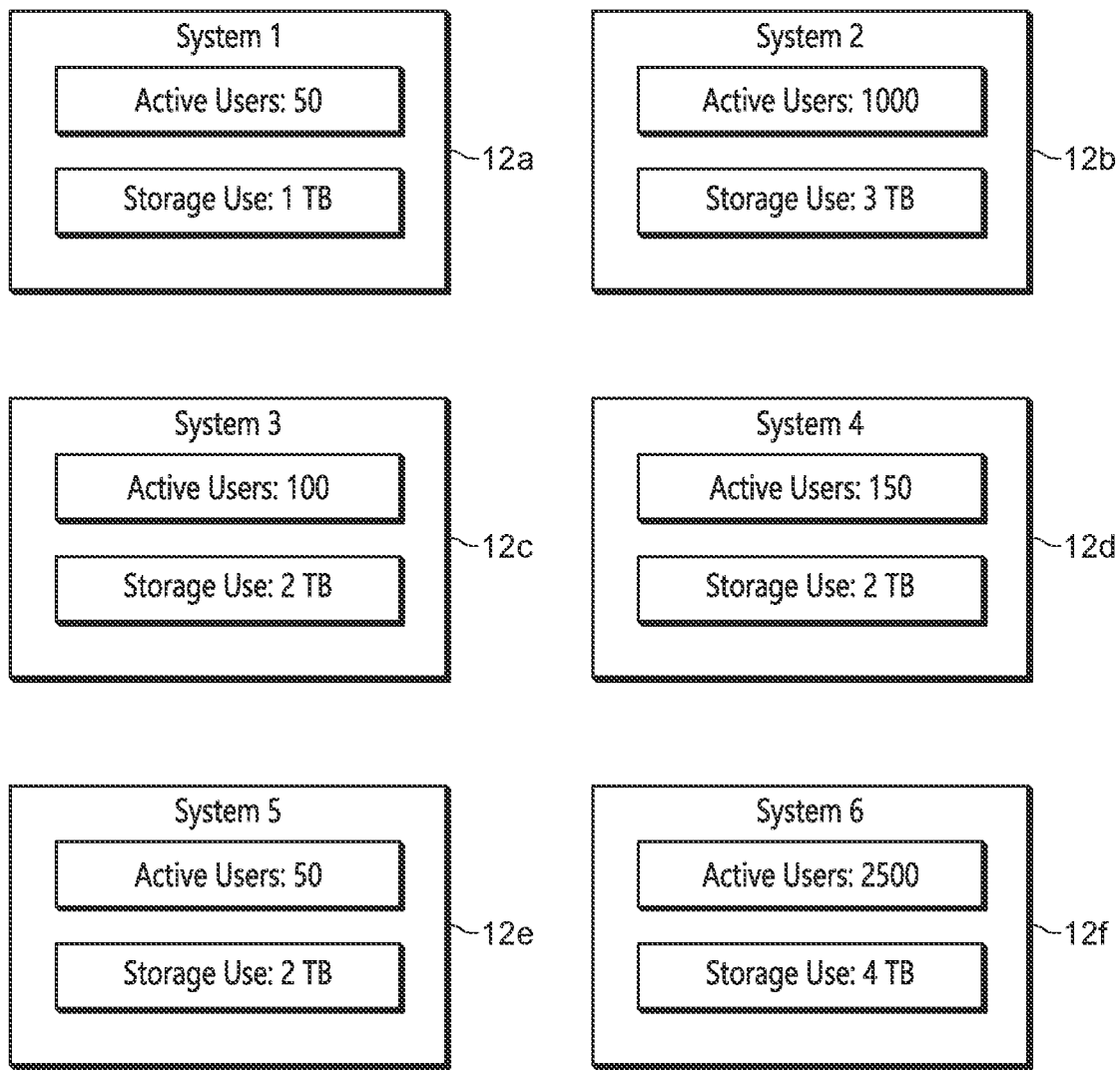
FIG. 7B illustrates a plurality of evaluated local network systems, according to some examples.
Figure 7C:
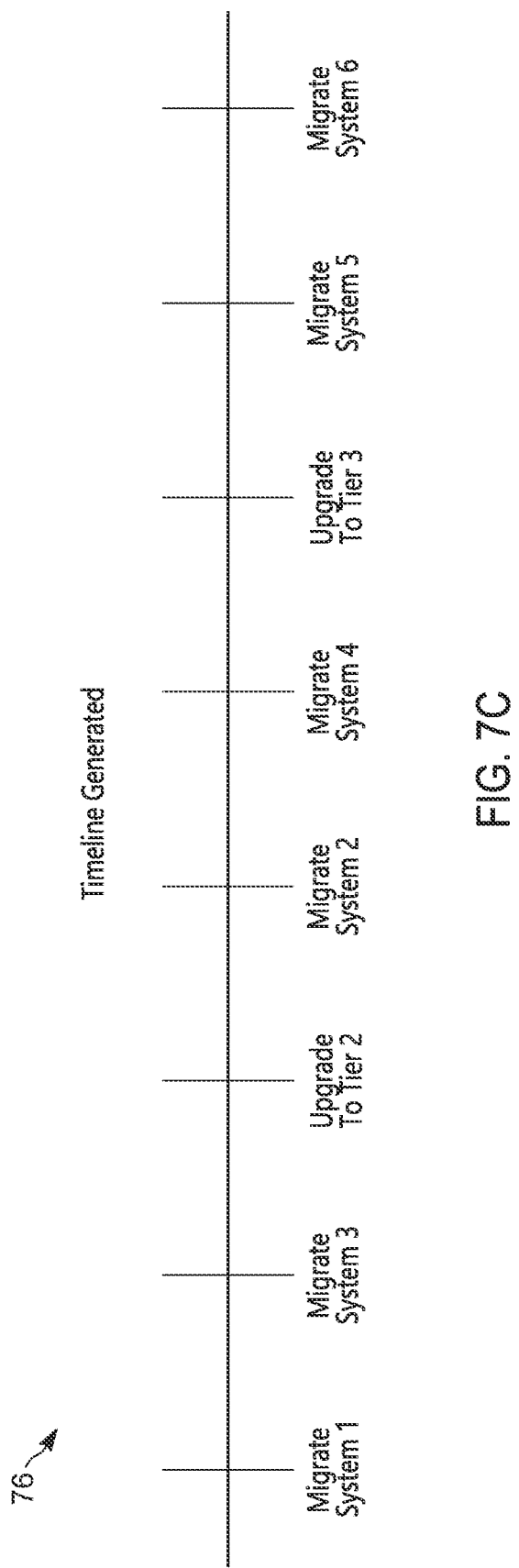
FIG. 7C illustrates an example cloud migration timeline, according to some examples.

FIGS. 7A-7C respectively illustrate an example cloud server 14 evaluated by the cloud management controller 16 (e.g., evaluated at blocks 104-108 of the method 600), an example set of local network systems 12 evaluated by the cloud management controller 16 (e.g., evaluated at blocks 112-116 of the method 600), and a resulting cloud migration timeline 76 generated by the cloud management controller 16 (e.g., at block 124 of the method 600).

Referring now to FIG. 7A, the cloud management controller 16 may determine a first network resource threshold 80a for the cloud server 14 defined by a user limit of 500 users and a storage limit of 5 TB, determine a second network resource threshold 80b for the cloud server 14 defined by a user limit of 500 users and a storage limit of 10 TB, and determine a third network resource threshold 80c for the cloud server 14 defined by a user limit of 8000 users and a storage limit of 20 TB. As described above, each network resource threshold 80a-80c may also be defined by a maximum event throughput and/or a maximum number of microservice instances. The cloud management controller 16 may also determine a current resource usage 84 for the cloud server 14 including 100 users and 2 TB of storage use.

Referring now to FIG. 7B, the cloud management controller 16 may determine that a first local network system 12a has a resource usage including 50 active users and 1 TB of storage, a second local network system 12b has a resource usage including 1,000 active users and 3 TB of storage, a third local network system 12c has a resource usage including 100 active users and 2 TB of storage, a fourth local network system 12d has a resource usage including 150 active users and 2 TB of storage, a fifth local network system 12e has a resource usage including 50 active users and 2 TB of storage, and a sixth local network system 12f has a resource usage including 2,500 active users and 4 TB of storage.

FIG. 7C illustrates an example cloud migration timeline 76 generated by the cloud management controller 16 based on the cloud network constraints of FIG. 7A and the local network systems usages of FIG. 7B. For example, the cloud management controller 16 may first schedule a migration of the first local network system 12a. The cloud management controller 16 may determine that, after a migration of the first local network system 12a is performed, the cloud server 14 will have insufficient resources available within the first network resource threshold 80a to host a migration of the second local network system 12b.

Rather than prematurely upgrading the capacity, or model, of the cloud server 14, the cloud management controller 16 migrates a maximum number of systems 12 for which a total of the cloud resource requirements of the selected systems 12 is less than or equal to the amount of cloud resources available within a current cloud resource threshold of the cloud server 14. For example, the cloud management controller 16 schedules a migration of the third local network system 12c after a migration of the first local network system 12a, and followed by an upgrade of the cloud server model to the second network resource threshold 80b. Similarly, the cloud management controller 16 schedules, after the upgrade of the cloud server model to the second network resource threshold 80b, consecutive migrations of the second local network system 12b and the fourth local network system 12d.

The cloud management controller 16 may determine that, after migration of the second local network system 12b and the fourth local network system 12d, the amount of cloud resources predicted to be available within the second network resource threshold 80b will be insufficient to migrate another system. Accordingly, the cloud migration controller 16 schedules an upgrade of the cloud server model to the third network resource threshold 80c after a scheduled migration of the fourth local network system 12d. The cloud management controller 16 schedules, after the second upgrade, the migration of the fifth local network system 12e followed by the migration of the sixth local network system 12f.

Figure 8:
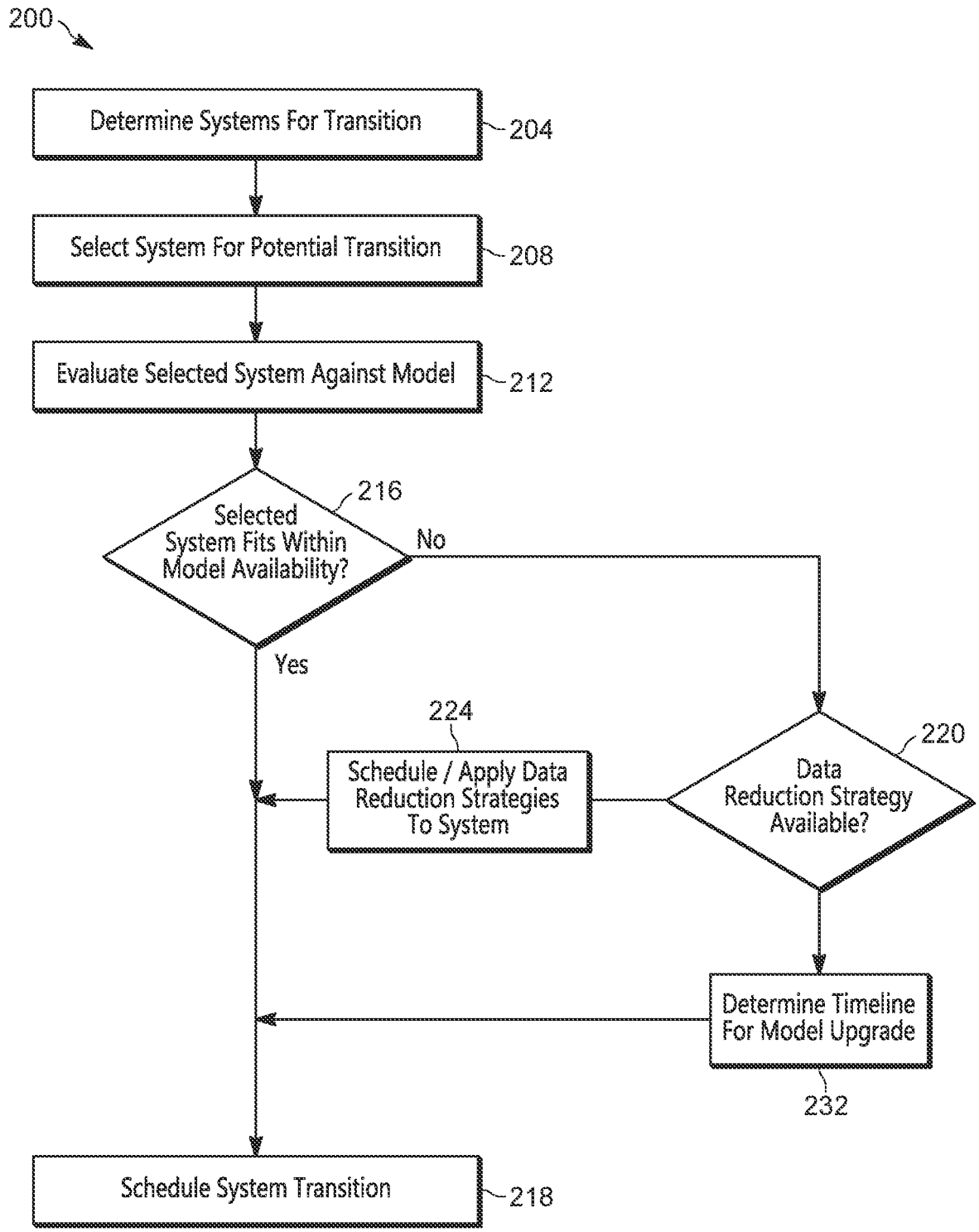
FIG. 8 illustrates a method for scheduling a cloud migration of a local network system, according to some examples.

Referring now to FIG. 8, an example method 200 for scheduling, with the cloud management controller 16, a migration of a respective local network system 12 is illustrated. The method 200 includes determining the set of local network systems 12 in the network system 10 awaiting migration to the cloud server 14 (at block 204). From the set of local network systems 12, the cloud management controller 16 selects a system 12 for potential migration (at block 208), and evaluates the selected system 12 against a current model of the cloud server 14 (at block 212). For example, the cloud management controller 16 predicts a cloud resource requirement of the selected system 12 as described above with respect to FIG. 6.

The cloud management controller 16 determines whether the cloud resource requirement of the selected system 12 fits within a resource availability of the current model for the cloud server 14 (at block 216). When the cloud resource requirement of the selected system 12 fits within a resource availability of the current model for the cloud server 14 ("YES" at block 216), the cloud management controller 16 schedules the transition, or migration, of the selected system 12 in the cloud migration timeline (at block 218). In contrast, when the cloud resource requirement of the selected system 12 does not fit within a resource availability of the current model for the cloud server 14 ("NO" at block 216), the cloud management controller 16 determines whether applying a data reduction strategy to the selected system 12 will cause the cloud resource requirement of the selected system 12 to fit within a resource availability of the current model for the cloud server 14 (at block 220). For example, the cloud management controller 16 determines whether a data reduction strategy (e.g., data retention and compression, reduction of event feeds to high priority only, etc.) will sufficiently reduce the cloud resource needs of the selected system 12 such that the selected system 12 can be migrated to the cloud server 14 without upgrading the current model.

When a sufficient data reduction strategy is available ("YES" at block 220), the cloud management controller 16 applies, or schedules the application of, the data reduction strategy to the selected system 12 (at block 224) and schedules the migration of the selected system 12 (at block 218). In contrast, when a sufficient data reduction strategy is not available ("NO" at block 220), the cloud management controller 16 determines an appropriate time to schedule a model upgrade of the cloud server 14 (at block 232). Determining an appropriate time to schedule a model upgrade of the cloud server 14 may including identifying other local network systems 12 that can first be migrated to the cloud server 14 without a model upgrade, as described above with respect to FIGS. 7A-7C. The cloud management controller 16 may accordingly schedule the upgrade after a scheduled migration of such other local network systems 12. The cloud management controller 16 schedules the migration of the selected system 12 after the scheduled upgrade of the cloud server model (at block 218).

Scheduling a migration of a selected system 12 (at block 218) may include scheduling a single migration for the entirety of the selected system 12, or scheduling separate migrations for particular components of the selected system 12, such as, for example, specific sites within the selected system 12 and/or specific workflows (e.g., monitoring workflows, configuration workflows, call processing workflows, etc.) of the selected system 12. The separate migrations for system components or workflows may be sequentially or non-sequentially scheduled in the cloud migration timeline for a respective selected system 12.

Figure 9:
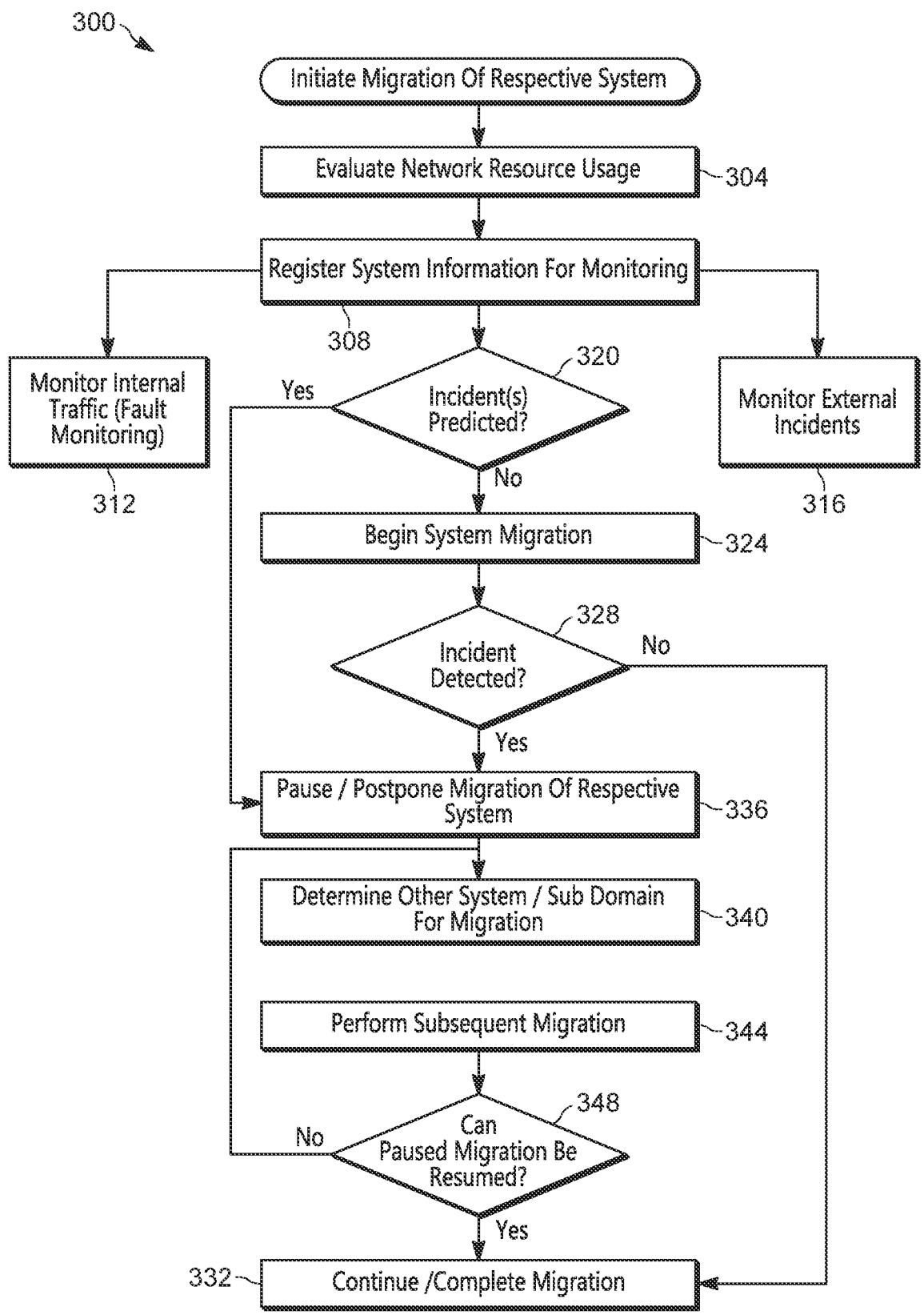
FIG. 9 illustrates a method for performing a cloud migration of a local network system, according to some examples.

FIG. 9 illustrates an example method 300 for executing migration of a respective local network system 12. The respective system 12 is, for example, a next upcoming system in the cloud migration timeline (for example, a first system in the cloud migration timeline if no systems 12 have been migrated). The method 300 includes evaluating a current network resource usage of the respective local network system 12 (at block 304). For example, the cloud management controller 16 may determine a number of sites included in the respective system 12, a number of users in the respective system 12, a current storage use of the respective system 12, event feeds of the respective system 12, workflows of the respective system 12, and/or the like.

For each site in the respective system 12 cloud management controller 16 registers network information for monitoring incidents that may interfere with the scheduled migration of the respective system 12 (at block 308). For example, the cloud management controller 16 may continuously or periodically monitor internal traffic for each site of the respective system 12 for possible network faults (at block 312) and continuously or periodically monitor for external incidents (at block 316). External incidents may include occurring or predicted increased call volume to a call center included in the respective system 12, an occurring or predicted building incident (e.g., a fire, a power outage, etc.) at a site included in the respective system 12, ongoing or predicted severe weather, or the like. For example, the cloud management controller 16 may use historical data 66 to predict periods of increased call volume, likelihood of network faults, or the like. Alternatively, or in addition, registering a site may include specifying a coverage area and/or location coordinates of the site with a domain that monitors for active incidents, such as weather incidents in the area of the site.

The cloud management controller 16 determines whether any incidents are occurring or are predicted with respect to the respective system 12 (at block 320). When no incidents are predicted with respect to the respective system 12, the cloud migration controller 16 initiates migration of the respective system 12 (at block 324). As described above, a scheduled migration of a respective system 12 may include a plurality of scheduled migrations of separate system components or workflows. Accordingly, the cloud migration controller 16 initiates the migration of either the entire respective system 12 or a respective component or workflow of the respective system 12.

During migration of the respective system 12, the cloud management controller 16 continuously or periodically determines whether any incidents are detected (at block 328), for example, by means of the monitoring performed at blocks 312-316. A detected incident may be an ongoing incident or a predicted incident that may interfere with the ongoing migration. When no incidents are detected ("NO" at block 328), the cloud management controller 16 continues and completes the respective current migration (at block 332). Completing the migration may include, for example, removing an on-premise workload associated with the completed migration.

When an incident is detected or predicted either before or during the migration of the respective system 12 (e.g., "YES" at block 320 or 328), the cloud management controller 16 modifies the cloud migration timeline by pausing or postponing the migration of the respective system 12 (at block 336).

The cloud management controller 16 determines a subsequent migration that can be performed while the current migration of the respective system 12 is paused or postponed (at block 340), and performs the subsequent migration (at block 344). The subsequent migration may be that of another sub-domain of the respective system 12 not affected by the detected or predicted incident. For example, in instances where the incident is an in-building incident, the cloud management controller 16 may determine that a subsequently scheduled migration of another site in the respective system 12 can still be performed. However, in some instances, the subsequent migration is that of a different system 12 (e.g., an entirety of a different system 12, or one or more workflows and/or components of a different system 12).

In some instances, the cloud management controller 16 predicts a length of time required to resolve the incident, and selects which subsequently scheduled migration to perform based on the predicted length of time. For example, the cloud migration timeline generated by the cloud management controller 16 may include an estimated migration length for each scheduled migration. The cloud management controller 16 may therefore, while a current migration is paused or postponed, perform a migration that fits within current model constraints of the cloud server 14 and will likely take approximately the same amount of time as resolution of the incident.

The cloud management controller 16 may perform the subsequently scheduled migration using a method substantially similar to the method 300 illustrated in FIG. 9 with respect to the subsequent migration.

The cloud management controller 16 determine whether the paused or postponed migration can be resumed (at block 348), for example, based on incident-monitoring performed at blocks 312-316. When incidents that may affect migration of the respective system are no longer detected and the paused or postponed migration of the respective system 12 can be resumed ("YES" at block 348), the cloud management controller 16 resumes and completes the paused or postponed migration of the respective system 12 (at block 332).

When incidents that may affect migration of the respective system are still detected and the paused or postponed migration of the respective system 12 cannot be resumed ("NO" at block 348), the cloud management controller repeats blocks 340-348 of the method 300.

In the foregoing specification, specific examples have been described. However, one of ordinary skill in the art appreciates that various modifications and changes can be made without departing from the scope of the claimed subject matter. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Additionally, unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations, for example, collectively. To reiterate, those electronic processors and processing may be distributed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A cloud server management system comprising:
   an electronic processor configured to:
   determine a first network resource threshold for a cloud server;
   determine a first cloud resource availability, wherein the first resource availability is an amount of cloud network resources available in the cloud server within the first network resource threshold;
   for each respective system of a plurality of local network systems
   determine a local resource usage, wherein the local resource usage is an amount of local network resources used by the respective system, and
   predict a cloud resource requirement, wherein the cloud resource requirement is an amount of cloud network resources required to provide a cloud-based equivalent of the respective system in the cloud server;
   build a model based on the cloud resource requirement for each respective system and the first network resource threshold, the model defining a cloud migration priority for each of the plurality of local network systems;
   based on the model, generate a cloud migration timeline for sequentially migrating each respective system to the cloud server; and
   initiate migration of the plurality of local network systems to the cloud server according to the cloud migration timeline.

2. The cloud server management system of claim 1, wherein the first network resource threshold includes at least one selected from the group consisting of a maximum number of users, a maximum storage capacity, a maximum event throughput, and a maximum number of microservice instances.

3. The cloud server management system of claim 1, wherein the electronic processor is configured to:
   generate the cloud migration timeline by selecting a first system included in the plurality of local network systems for which the cloud resource requirement of the first system is less than or equal to the first cloud resource availability; and
   schedule migration of the first system at a time in the cloud migration timeline before a scheduled migration of a respective system for which the cloud resource requirement of the respective system is greater than the first cloud resource availability.

4. The cloud server management system of claim 3, wherein the electronic processor is further configured to:
   determine a second cloud resource availability, wherein the second cloud resource availability is an amount of cloud network resources available in the cloud server after migration of the first system and within the first network resource threshold;
   determine a second network resource threshold for the cloud server that is greater than the first network resource threshold;

determine a third cloud resource availability, wherein the third cloud resource availability is an amount of cloud network resources available in the cloud server after migration of the first system and within the second network resource threshold;

select a second system included in the plurality of local network systems for which the cloud resource requirement of the second system is greater than the second cloud resource availability but less than or equal to the third cloud resource availability; and schedule migration of the second system at a time in the cloud migration timeline after a scheduled migration of the first system but before a scheduled migration of a respective system for which the cloud resource requirement is greater than the third cloud resource availability.

5. The cloud server management system of claim 3, wherein the first system is included in a first set of systems, the first set of systems include a maximum number of systems for which a total of the cloud resource requirement of each system included in the first set of systems is less than or equal to the first cloud resource availability, and the electronic processor is further configured to schedule an upgrade of the model at a time in the cloud migration timeline that is after a scheduled migration of each system included in the first set of systems but before a scheduled migration of a different system not included in the first set of systems, wherein the upgrade is associated with a second network resource threshold for the cloud server that is larger than the first network resource threshold.

6. The cloud server management system of claim 5, wherein the electronic processor is configured to select the maximum number of systems included in the first set of systems by predicting a future local network resource usage of each of the plurality of local network systems, and a total future network local resource usage of the first set of systems is less than or equal to the first cloud resource availability.

7. The cloud server management system of claim 3, wherein the electronic processor is further configured to apply a data reduction strategy to the scheduled migration of the first system, and the cloud resource requirement of the first system is determined according to the data reduction strategy.

8. The cloud server management system of claim 1, wherein the electronic processor is further configured to:

monitor for incidents that may interfere with a scheduled migration of a respective system in the cloud migration timeline; and in response to identifying an incident that may interfere with the scheduled migration of a respective system, modify the cloud migration timeline by pausing or postponing the scheduled migration of the respective system.

9. The cloud server management system of claim 8, wherein the incident includes at least one selected from the group consisting of a weather event near a site included in the respective system, a network fault in the respective system, increased call volume to a call center included in the respective system, and a building incident at a site included in the respective system.

10. The cloud server management system of claim 8, wherein the incident is a predicted incident.

11. The cloud server management system of claim 8, wherein modifying the cloud migration timeline includes selecting a subsequently scheduled migration in the cloud migration timeline, and initiating migration of the subsequently scheduled migration while the respective migration is paused or postponed.

12. The cloud server management system of claim 1, wherein each respective system is associated with a number of sites, a number of users, and a network storage usage.

13. The cloud server management system of claim 1, wherein the cloud resource requirement of the respective system in the cloud server includes an amount of cloud network resources required to perform the migration and an amount of cloud network resources required to maintain the cloud-based equivalent.

14. The cloud server management system of claim 1, wherein each respective system is associated with a migration history of migrated workloads included in the respective system, and the electronic processor is further configured to:

modify the cloud migration timeline in response to predicting, based on the migration history of the respective system, at least one selected from the group consisting of an amount of time required to migrate other workloads of the respective system and an amount of cloud network resources required to migrate other workloads of the respective system.

15. A method for orchestrating multi-tenant cloud migration, the method comprising:

determining a first network resource threshold for a cloud server;

determining a first cloud resource availability, wherein the first resource availability is an amount of cloud network resources available in the cloud server within the first network resource threshold;

for each respective system of a plurality of local network systems:

determining a local resource usage, wherein the local resource usage is an amount of local network resources used by the respective system, and predicting a cloud resource requirement, wherein the cloud resource requirement is an amount of cloud network resources required to provide a cloud-based equivalent of the respective system in the cloud server;

building a model based on the cloud resource requirement for each respective system and the first network resource threshold, the model defining a cloud migration priority for each of the plurality of local network systems;

based on the model, generating a cloud migration timeline for sequentially migrating each respective system to the cloud server; and initiating migration of the plurality of local network systems to the cloud server according to the cloud migration timeline.

16. The method of claim 15, wherein the first network resource threshold includes at least one selected from the group consisting of a maximum number of users, a maximum storage capacity, a maximum event throughput, and a maximum number of microservice instances.

17. The method of claim 15, wherein generating the cloud migration timeline includes:
- selecting a first system included in the plurality of local network systems for which the cloud resource requirement of the first system is less than or equal to the first cloud resource availability; and
- scheduling migration of the first system at a time in the cloud migration timeline before a scheduled migration of a respective system for which the cloud resource requirement of the respective system is greater than the first cloud resource availability.

18. The method of claim 17, further comprising:
- determining a second cloud resource availability, wherein the second cloud resource availability is an amount of cloud network resources available in the cloud server after migration of the first system and within the first network resource threshold;
- determining a second network resource threshold for the cloud server that is greater than the first network resource threshold;
- determining a third cloud resource availability, wherein the third cloud resource availability is an amount of cloud network resources available in the cloud server after migration of the first system and within the second network resource threshold;
- selecting a second system included in the plurality of local network systems for which the cloud resource requirement of the second system is greater than the second cloud resource availability but less than or equal to the third cloud resource availability; and
- scheduling migration of the second system at a time in the cloud migration timeline after a scheduled migration of the first system but before a scheduled migration of a respective system for which the cloud resource requirement is greater than the third cloud resource availability.

19. The method of claim 17, wherein
the first system is included in a first set of systems,
the first set of systems include a maximum number of systems for which a total of the cloud resource requirement of each system included in the first set of systems is less than or equal to the first cloud resource availability, and
the method further comprises scheduling an upgrade of the model at a time in the cloud migration timeline that is after a scheduled migration of each system included in the first set of systems but before a scheduled migration of a different system not included in the first set of systems, wherein the upgrade is associated with a second network resource threshold for the cloud server that is larger than the first network resource threshold.

20. The method of claim 19, wherein selecting the maximum number of systems included in the first set of systems includes predicting a future local network resource usage of each of the plurality of local network systems, and
a total future network local resource usage of the first set of systems is less than or equal to the first cloud resource availability.

* * * * *